Feb. 24, 1948.    R. H. SHEPARD    2,436,493
MECHANICAL LUBRICATOR
Filed July 5, 1946

RALPH H. SHEPARD
INVENTOR

BY Walter S. Wallheim
ATTORNEY

Patented Feb. 24, 1948

2,436,493

UNITED STATES PATENT OFFICE 2,436,493

MECHANICAL LUBRICATOR

Ralph H. Shepard, New York, N. Y., assignor to Nathan Manufacturing Company, New York, N. Y., a corporation of New York Application July 5, 1946, Serial No. 681,511

7 Claims. (Cl. 184—27)

This invention relates to mechanical lubricators of the type in which a lubricant is forced under pressure to the point to be lubricated by a pumping unit having a piston reciprocating within a cylinder.

It is the principal object of the invention to provide a lubricator of this type which has, preferably, only one pumping unit within its structure and in which the piston of the pumping unit is operated on the principles disclosed in Patent #2,369,345, issued to Bengt E. Folke on February 13, 1945.

Another object is to arrange the pumping piston and its drive shaft in axial alignment, while permitting reciprocating travel of the piston.

A further object is to provide a lubricator of this type in which the number of component parts has been greatly reduced in comparison with similar mechanism used heretofore, which is efficient in operation, simple to adjust, and which can be produced at relatively low cost.

Still other objects will become apparent after a perusal of the following specification and an inspection of the accompanying drawings in which a preferred embodiment of the invention is described and shown.

In the drawings.

Like characters of reference denote similar parts through the several views and the following specification.

Figure 1:
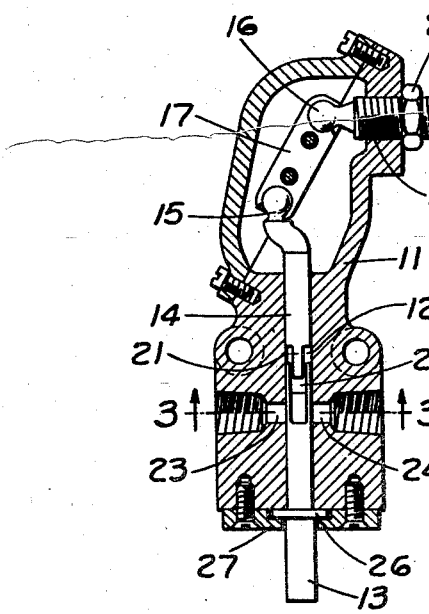
Fig. 1 is a longitudinal sectional view of the lubricator with its piston at the end of its suction stroke.

The lubricator consists of a housing 11 having a single cylindrical bore 12 for a drive shaft 13 and a piston 14. The lower end of the drive shaft projects exteriorly from the housing and is connected to suitable rotating means. Shaft 13, in turn, rotates piston 14 by way of a tongue and groove joint described later.

Piston 14 is given a reciprocating motion by operating means disclosed in U. S. Patent #2,369,345 and which include a ball-shaped pivot 15 eccentrically disposed at the upper end of the piston and integral with it, a manually adjustable ball-shaped fixed pivot 16, which is the terminal of an adjusting screw 18 through the housing 11 held in desirable position by a lock nut 20, and a universal coupling 17, consisting of halves 17a and 17b, held together by screws 17c connecting eccentric pivot 15 with fixed pivot 16.

The lower end of piston 14 is provided with a tongue 21, which extends into a groove 22 in the top of drive shaft 13. Rotation of shaft 13 is thus transmitted to the tongue 21 and rotates piston 14. The bottom of groove 22 is slanted, having a low edge 25 and a high edge 25a, so that during rotation of shaft 13, inlet passage 23 and outlet passage 24 alternately communicate with the cylinder 12 by way of groove 22, i. e., while edge 25 is low enough to expose inlet passage 23, edge 25a is high enough to shut off outlet passage 24. Thus, the shaft 13 serves as a rotary valve for the cylinder, opening alternately inlet and outlet passages. Tongue 21 fits loosely in groove 22, so that all parts of the space between the bottom of piston 14 and the top of shaft 13 are in communication with cylindrical bore 12.

Figure 4:
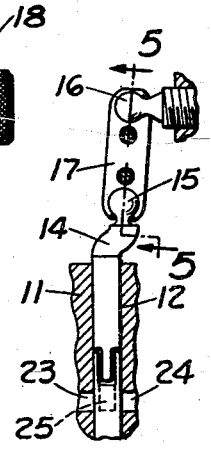
Fig. 4 is a fragmentary sectional view, partly in elevation, similar to Fig. 1, but showing the piston at the end of its forcing stroke.
Figure 2:
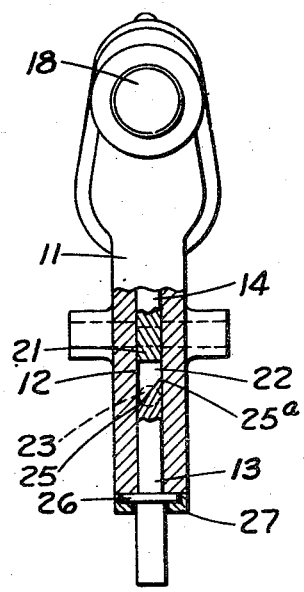
Fig. 2 is a side view of the lubricator, partly in section, to show the porting of the piston.
Figure 3:
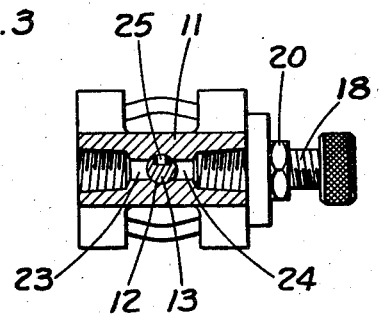
Fig. 3 is a horizontal sectional view along the plane of line 3—3 in Fig. 1.
Figure 5:
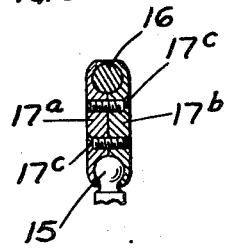
Fig. 5 is a fragmentary sectional view along the plane of line 5—5 in Fig. 4.

As the piston is rotated, by virtue of the eccentricity of pivot 15 and the constant distance between the fixed pivot 16 and the eccentric pivot 15 connected by universal coupling 17, in the extreme position shown in Fig. 1 the piston is lifted up to its highest position which is the end of its suction stroke. After making a one-half revolution to the position shown in Fig. 4, the piston will be at the end of its forcing stroke. During the up-stroke or suction stroke oil is drawn into cylindrical bore 12 through inlet passage 23 when groove 22 communicates with that passage during the rotation of the drive shaft 13, as explained before, while outlet passage 24 is closed by the shaft 13 below the high edge 25a of the bottom of the groove, and oil is discharged on the down-stroke or forcing stroke through outlet passage 24 while groove 22 communicates with passage 24 and shaft 13 shuts off inlet passage 23.

A shoulder 26 is provided on drive shaft 13 which rests against the bottom of housing 11 and is held thereby a retaining plate 27 to prevent reciprocatory travel of the shaft and keep it in fluid tight relation to the housing.

By adjusting the position of fixed pivot 16 with respect to the piston axis, the stroke of the piston can be varied. If the pivot 16 and piston 14 are in axial alignment, no reciprocatory travel of the piston takes place and there will be no oil discharge. With the pivot 16 out of alignment with the axis of the piston, reciprocatory travel will take place in proportion to the distance between the pivot 16 and the axis of piston 14.

While I have shown a tongue and groove joint between piston and drive shaft, any other suitable connecting means obviously may be used.

Many other changes in the form, proportion, combination of parts and minor details of construction may be resorted to without departing from the principles or sacrificing any of the advantages of the invention, as defined in the appended claims.

What I claim as new is:

1. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, means forcing the piston to rotate in unison with the shaft, an eccentric pivot carried by the piston, and a fixed pivot laterally displaced with reference to the piston axis, said pivots being connected together, rotation of the shaft rotating and reciprocating the piston.

2. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, means forcing the piston to rotate in unison with the shaft, an eccentric pivot carried by the piston, a fixed pivot laterally displaced with reference to the piston axis, said pivots being connected together, rotation of the shaft rotating and reciprocating the piston, and means for adjusting the lateral displacement of the fixed pivot to regulate the stroke of the piston.

3. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, a tongue and groove joint between piston and shaft, an eccentric pivot carried by the piston, and a fixed pivot laterally displaced with reference to the piston axis, said pivots being connected together, rotation of the shaft rotating and reciprocating the piston.

4. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, means forcing the piston to rotate in unison with the shaft, an eccentric pivot carried by the piston, an adjusting screw in said housing, and a fixed pivot laterally displaced with reference to the piston axis and carried by the screw, said pivots being connected together, rotation of the shaft rotating and reciprocating the piston.

5. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, a tongue and groove joint between piston and shaft, an eccentric pivot carried by the piston, an adjusting screw in said housing, and a fixed pivot laterally displaced with reference to the piston axis and carried by the screw, said pivots being connected together, rotation of the shaft rotating and reciprocating the piston.

6. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, means forcing the piston to rotate in unison with the shaft, an eccentric pivot carried by the piston, a fixed pivot laterally displaced with reference to the piston axis, a universal coupling and ball joints at both ends of the coupling connecting it with, respectively, the eccentric pivot and the fixed pivot, rotation of the shaft rotating and reciprocating the piston.

7. In a mechanical lubricator, comprising a housing having an inlet passage, an outlet passage and a cylinder, a rotary and reciprocatory piston in the cylinder, a rotary drive shaft within the cylinder and projecting exteriorly thereof, the drive shaft having a port for alternately placing the inlet passage and the outlet passage in communication with the cylinder as the shaft rotates, means forcing the piston to rotate in unison with the shaft, an eccentric pivot carried by the piston, a fixed pivot laterally displaced with reference to the piston axis, a universal coupling connecting the eccentric pivot and the fixed pivot, rotation of the shaft rotating and reciprocating the piston, and a cover for the coupling attached to the housing.

RALPH H. SHEPARD.

REFERENCES CITED

The following references are of record in the file of this patent:

UNITED STATES PATENTS

| Number | Name | Date |
| --- | --- | --- |
| 1,573,525 | Sandoz | Feb. 16, 1926 |
| 2,070,203 | Gregg | Feb. 9, 1937 |